Aug. 30, 1966 N. W. MIZELLE 3,269,769
TV LOUNGER RECLINING CHAIR FIXTURE
Filed May 13, 1965 7 Sheets-Sheet 1
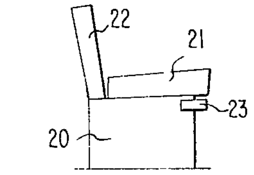
FIG. 1
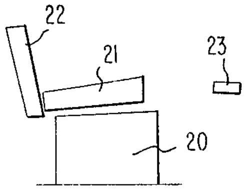
FIG. 2
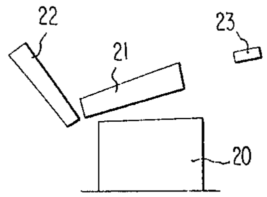
FIG. 3
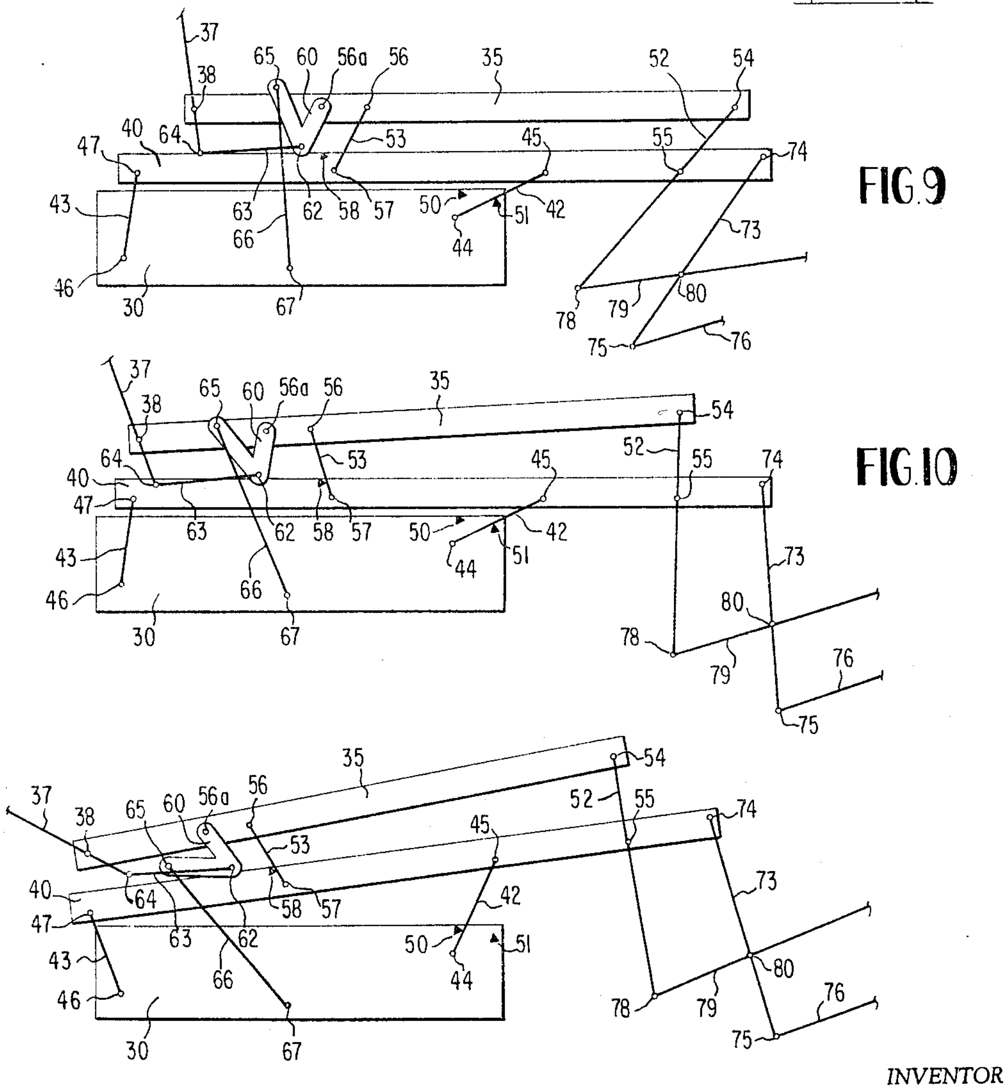
FIG. 9, FIG. 10
FIG. 11
INVENTOR
NED W. MIZELLE
BY Browne, Schuyler & Beveridge
ATTORNEYS Aug. 30, 1966 N. W. MIZELLE 3,269,769

TV LOUNGER RECLINING CHAIR FIXTURE

Filed May 13, 1965 7 Sheets-Sheet 2

INVENTOR.
NED W. MIZELLE

BY Browne, Schuyler & Beveridge
ATTORNEYS

INVENTOR.
NED W. MIZELLE
BY
Browne, Schuyler & Beveridge
ATTORNEYS

Aug. 30, 1966 N. W. MIZELLE 3,269,769

TV LOUNGER RECLINING CHAIR FIXTURE

Filed May 13, 1965 7 Sheets-Sheet 4

INVENTOR.
NED W. MIZELLE

BY

Browne, Schuyler & Beveridge
ATTORNEYS

Aug. 30, 1966 N. W. MIZELLE 3,269,769

TV LOUNGER RECLINING CHAIR FIXTURE

Filed May 13, 1965 7 Sheets-Sheet 5

INVENTOR.
NED W. MIZELLE
BY Browne, Schuyler & Beveridge
ATTORNEYS

TV LOUNGER RECLINING CHAIR FIXTURE

Filed May 13, 1965 7 Sheets-Sheet 6

INVENTOR.

NED W. MIZELLE

BY

Browne, Schuyler & Beveridge

ATTORNEYS

Aug. 30, 1966 N. W. MIZELLE 3,269,769

TV LOUNGER RECLINING CHAIR FIXTURE

Filed May 13, 1965 7 Sheets-Sheet 7

INVENTOR.
NED W. MIZELLE
BY
Browne, Schuyler & Beveridge
ATTORNEYS

United States Patent Office 3,269,769

Patented August 30, 1966

3,269,769

TV LOUNGER RECLINING CHAIR FIXTURE

Ned W. Mizelle, High Point, N.C., assignor to General Steel Products, Inc., High Point, N.C., a corporation of North Carolina Filed May 13, 1965, Ser. No. 455,562

15 Claims. (Cl. 297—85)

This invention relates to improved reclining chair fixtures and particularly to a three-way, three-position TV lounger. The term three-way refers to a chair in which the back rest, the seat and an extendible leg rest are each individually pivotally supported for movement relative to the base of the chair and to each other. The term three-position refers to the three general positions in which the basic chair components may be positioned: (1) an upright normal position in which the seat and back are angularly disposed relative to each other to define a normal upright seating angle with the back and seat, as a unit, in an upright position relative to the chair base with the leg rest platform retracted to be below the seat, (2) an intermediate "TV viewing" position in which the back and seat remain angularly disposed relative to each other to subtend the normal upright seating angle but the seat and back are moved as a unit rearwardly and tilted slightly rearwardly from the normal upright position with the leg rest extended in front of and substantially in line with the seat in a leg supporting position, and (3) a fully reclined position in which the back is tilted rearwardly relative to the seat to define a much larger angle with the seat than the normal seating angle and the seat is moved further rearwardly and tilted up slightly more than in the intermediate position with the leg rest remaining in an extended leg supporting position generally in line with and in front of the seat.

Such chairs have become increasingly popular in recent years. The occupant of the chair adjusts it to the position which he desires by pressing rearwardly in the seat by applying pressure on the arm rests which forces the seat and back rearwardly on the base and slightly reclines the seat and back unit while the seat motion drives the leg rest forward from a nesting position in the base to the forward leg supporting position. In the normal position the occupant is sitting upright in the chair with his feet resting on the floor, and the leg rest is retracted beneath the chair. By pressing on the arms the seat and back of the chair are propelled rearwardly and slightly tilted and the leg rest is extended ahead of the seat so that the chair assumes the intermediate poistion in which the occupant's body position is generally erect, facing forwardly and slightly reclined with his legs extending horizontally ahead and resting on the leg rest which is ahead of and generally in line with the seat. By further rearward pressure on the seat, the occupant can cause the back to tilt rearwardly relative to the seat to define a relatively large angle between the seat and back and also to tilt the seat and leg rest upwardly to the fully reclined position in which the occupant is in a supine, upwardly facing position with his legs supported on the leg rest in line with and ahead of the seat.

There are two widely used leg rest arrangements, in the first of which the leg rest is pivoted from the extended horizontal position through approximately 90° to a vertical position forming the bottom front face of the chair base, and in the second of which the leg rest is pivoted from the extended horizontal position approximately 180° to lie under the bottom of the chair. The latter type of leg rest is commonly known as the "high leg type" in which there is a substantial clearance provided between the floor and the bottom of the chair. Obviously, in the type wherein the leg rest is retracted 90° to form the front face of the chair bottom, little clearance exists between the floor and the bottom of the chair. The embodiments described subsequently utilize the high leg type leg rest, but it should be understood that any type of leg rest is contemplated for use with this fixture.

An object of this invention is to provide a fixture for a three-way, three-position reclining chair which provides a smooth and positive action throughout the full range of operation of the chair.

Another object is to provide a fixture for a three-way, three-position reclining chair having positive means for stopping the chair action in the three different positions.

The foregoing and other objects are achieved in fixtures in which a seat link member attached to the seat is supported for pivotal swinging motion relative to an intermediate member and a fixed base member in moving between the normal and the intermediate positions, the intermediate member remaining fixed relative to the base member and a seat stop member restraining motion of the seat link rearwardly of the intermediate chair position. The base member is affixed to the chair base. The leg rest is pivotally supported by a conventional linkage system in which the ends of at least two links are connected to the seat link or its supporting link and the intermediate member for extending and retracting the leg rest upon relative motion between the seat link and the intermediate member. A back link attached to the back is pivotally hinged to the rear of the seat link and an extensible link arrangement pivotally interconnects the back link, the seat link and the base member. The intermediate member is supported for swinging motion relative to the base member, and another stop member restricts the intermediate member from moving forwardly of the base member from the intermediate position. Movement of the seat link rearwardly of the intermediate position along with the intermediate member, which is carried rearwardly with the seat link due to the action of the seat stop member, is concurrent with rotation of the back link about the seat link by the action of the extensible link arrangement which causes the intermediate member and seat link to pivot rearwardly relative to the base member between the intermediate and fully reclined chair positions.

Other objects and features of the invention will be apparent by reference to the following description which is illustrated by the attached drawings in which:

FIGURE 1 is a schematic side elevation view of the chair showing the back, seat an footrest in the normal position;

FIGURE 2 is a schematic side elevation view of the chair in the intermediate position;

FIGURE 3 is a schematic side elevation view of the chair in the fully reclined position;

FIGURE 9 is a schematic partial side elevation of the embodiment of the fixture shown in FIGURES 4–7 with the links arranged intermediate the normal and intermediate chair positions;

FIGURE 10 is a schematic partial side elevation similar to FIGURE 9 with the links arranged in the intermediate chair position;

FIGURE 11 is a schematic partial side elevation similar to FIGURE 10 in which the links are arranged in the fully reclined chair position;

*General*

In FIGURE 1 the chair, comprising a base 20, a seat 21, a back 22 and a leg rest 23 is shown in the normal upright position with the back 22 and seat 21 angularly disposed relative to each other at a comfortable seating angle with the seat and back unit positioned in a generally upright position relative to the base 20 and the foot rest 23 retracted into the chair. FIGURE 2 illustrates the chair in an intermediate position in which the angle between the back 22 and seat 21 remains unchanged but the seat and back as a unit are swung rearwardly and slightly upwardly relative to the base 20 so that the front of the seat 21 is slightly elevated with the leg rest 23 positioned ahead of and substantially in line with the seat 21 to place the unit in a partially reclined position. FIGURE 3 illustrates the chair in the fully reclined position in which the back 22 is tilted rearwardly on the seat 21 in a manner to define an angle substantially greater than in the normal position and the seat and back are moved further rearwardly with the seat front elevated more than in the intermediate position and the leg rest 23 retained in a position generally in line with and in front of the seat. Thus, it can be seen that in the position illustrated in FIGURE 1 the chair occupant is sitting in the normal upright, forward facing position with his feet on the floor and the leg rest retracted. In the intermediate position of FIGURE 2 the occupant faces substantially forward in a position to view a television screen or converse with other persons but with his legs extending forwardly to rest on the leg rest. In a fully reclined position illustrated in FIGURE 3, the chair occupant is in a fully reclined position on his back in a supine position facing generally upwardly toward the ceiling with his legs extending forwardly and resting on the leg rest.

*Embodiments of FIGURES 4–11*

The first embodiment illustrated is that of FIGURES 4–11, FIGURES 9–11 being a schematic representation of the actual embodiment shown in FIGURES 4–8. The mechanics of the linkage system can probably be more easily understood by reference to the schematic drawings of FIGURES 9–11.

The fixture illustrated in FIGURES 4–8 represents one of two fixtures by means of which the back, seat and leg rest of the reclining chair are affixed for movement relative to the chair frame. One fixture is mounted on each side of the chair frame, and since the two fixtures differ only in being right handed or left handed, only one fixture is described and illustrated.

Figure 4:
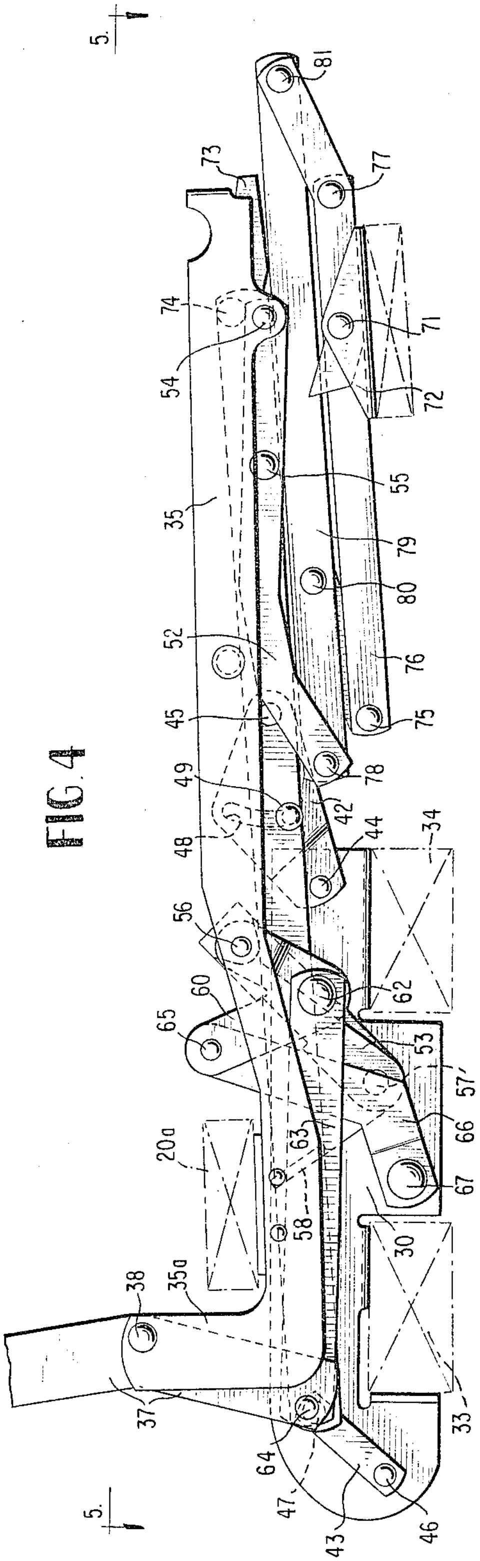
FIGURE 4 is a side elevation view of one embodiment of a fixture with the links arranged to place the chair in the normal upright position in which the leg rest is fully retracted.

The fixture has a base member 30 which is mounted parallel to the sides of the chair through the flange plates 31 and 32, which extend perpendicularly from the rear and forward lower sections of the base member, bolts or other fastening devices being used to affix the flanges to chair structural members 33 and 34 of the chair base 20, the base member having suitable cutouts as illustrated in FIGURE 4 to accommodate the transversely extending chair structural members. A seat link 35 is adapted for attachment to the bottom of the seat 21 by the flange 36 by attachments to a seat structural member 20*a* as well as other structural members. A back link 37, adapted for being affixed to the back 22 of the chair by structural fastenings, not illustrated for purposes of simplicity, is pivotally mounted on an upwardly extending rear section 35*a* of the seat link 35 by the pivot 38.

An intermediate member 40 is supported from the base member 30 for forwardly and rearwardly swinging motion by an intermediate member support linkage means comprising a forward intermediate member support link 42 and a rear intermediate member support link 43. The forward intermediate member support link 42 is pivotally connected at one end to the forward portion of the base member 30 by pivot 44 and to the intermediate member 40 by pivot 45, the rear intermediate support link 43 is similarly pivotally connected at either end to the base member 30 by pivot 46 and to the rear portion of the intermediate member 40 by pivot 47. The forward intermediate member support link 42 contains a slot 48 in which a pin 49, which is projecting out from the intermediate member, rides until it contacts either the upper end 50 or the lower end 51 of the slot 48. The pin 49 and the two ends of the slot 48 function as a stop means whose purpose will be subsequently described.

The seat link 35 is supported from the intermediate member 40 for rotational and translational relative movement thereto by the seat support linkage means comprising the forward seat support link 52 and the rear seat support link 53. The front seat support link 52 is pivotally connected at one end to the forward portion of the seat link by pivot 54 and intermediate its ends to the intermediate member by pivot 55, the rear seat support link 53 being pivotally connected at its ends to a more rearward portion of the seat link by pivot 56 and to the intermediate member by pivot 57 located on a tab 40*a* extending below the intermediate member. A projecting flange 58 extends outwardly from the rear portion of the tab 40*a* affixed to the intermediate member 40 and is so located that the rear edge of the rear seat support link 53 will contact the flange 58 when the seat link 35 is swung rearwardly on its seat support linkage means to the intermediate chair position, thus permitting no further rearward motion of the seat link 35 relative to the intermediate member 40.

An extensible linkage means for shifting the seat link 35 and intermediate member 40 between the intermediate chair position and the fully reclined chair position, while rotating the back link 37 about pivot 38 on the seat link, interconnects between the seat link 35, the back link 37 and the base member 30. This extensible linkage means includes a crank arm in the form of bell crank 60 which is pivotally connected at one end to the seat link 35 by the same pivot 56 which connects the rear seat support link 53 to the seat link, the pivot connection for the crank arm 60 being designated as 56*a* to distinguish between the two pivots. A common pivot is not necessary, separate pivots being shown on the schematic diagrams of FIGURES 9–11. An intermediate point on the bell crank 60 has a pivotal connection 62 pivotally connecting to one end of link 63 whose other end pivotally connects by pivot 64 to the lower end of the back link 37. The other end of the bell crank 60 has a pivotal connection 65 to one end of a pivoting link 66 whose other end is pivotally connected to the base member 30 by pivot 67. A tension spring 90 connects at one end to a projection 91 extending outwardly from the intermediate member 40 and at the other end to the flange 32 of the base members 30 as shown in FIGURE 5.

The leg rest 23 is supported from the forward seat support link 52 and the intermediate member 40 through the leg rest supporting linkage means which comprises a four bar linkage of which the outer link 70 has a pivotal connection 71 near its outer end to a leg rest link 72 to which is affixed the leg rest 23 by fasteners which are not illustrated. The four bar linkage has one link 73 pivotally connected at one end by pivot 74 to the outer portion of the intermediate member 40 and the other end pivotally connected by pivot 75 to one end of a second link 76 whose other end is pivotally connected by pivot 77 to the outer link 70 intermediate its ends. The lower end of the forward seat support link 52 has a pivotal connection 78 to one end of a third link 79 of the four bar linkage, and this third link has a pivotal connection 80 intermediate its ends to the first link 73 of the four bar linkage and a pivotal connection 81 at its other end to the outer end of the outer link 70. A tension spring 82 connects at one end to a pin 83 on the intermediate member 40 and at the other end to a tab 84 projecting from the end of the leg rest supporting link 73 which attaches to the intermediate member 40.

Figure 5:
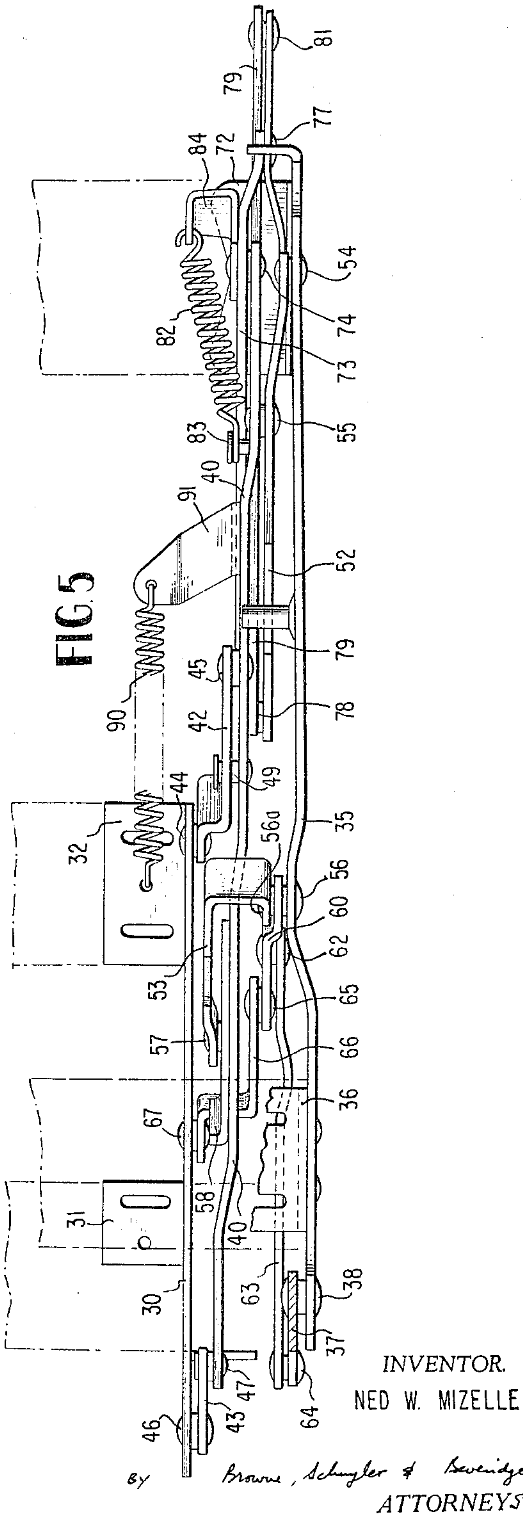
FIGURE 5 is a plan view of the fixture of FIGURE 4 taken along the section line 5—5 of FIGURE 4.
Figure 6:
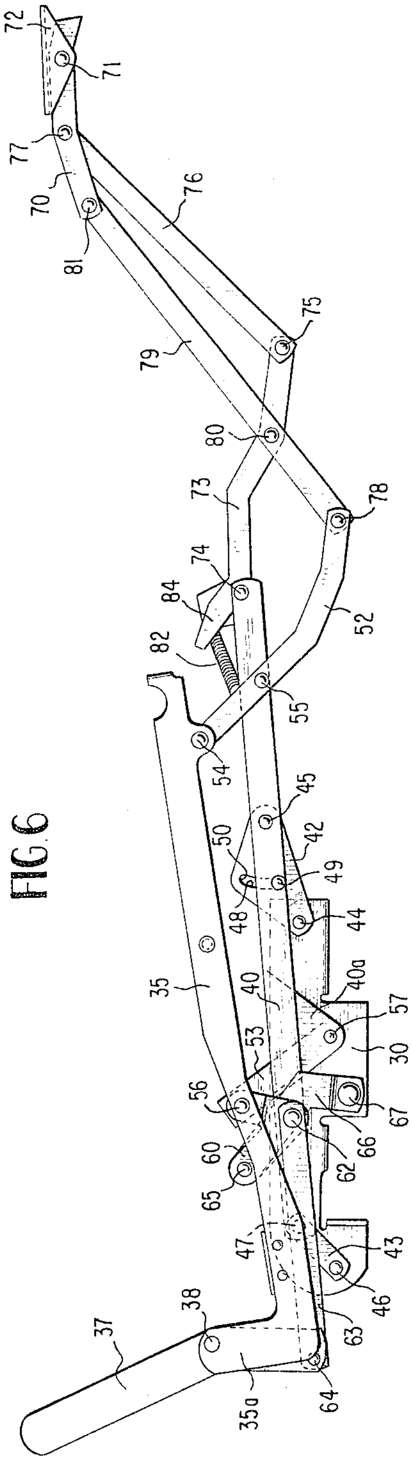
FIGURE 6 is a side elevation view of the fixture of FIGURE 5 with the links arranged in the intermediate chair position.

The operation of the embodiment described above is probably best understood by referring primarily to FIGURES 9–11 and secondarily to FIGURES 4–7. FIGURES 4 and 5 show the arrangement of the linkages with the chair in the normal position of FIGURE 1 with the seat and back angularly disposed to define an upright seating angle, the seat generally horizontal and the leg rest retracted under the seat with the top of the footrest facing downwardly. The seat link 35 and the intermediate member 40 are in their forwardmost positions relative to the base member 30 with the four bar linkage arrangement supporting the leg rest tucked rearwardly generally beneath the seat link and intermediate member. The back link 37 is in its most erect position relative to the seat link 35 and the bell crank 60 is in its uppermost position relative to the seat link 35.

When the chair occupant exerts rearward pressure on the seat 21 and the attached seat link 35, the seat link rotationally and translationally swings rearwardly relative to the intermediate member 40 about the forward and rear seat support links 52 and 53 through the position illustrated in FIGURE 9 until the rear seat support link 53 engages the seat stop flange 68 extending outwardly from the intermediate member 40, which establishes the intermediate position. During this movement of the seat link 35, the intermediate member 40 remains fixed relative to the base member 30, the intermediate member not moving forward of its forward position shown in FIGURES 4 and 6 due to the action of the stop pin 49 engaging the lower end of the slot 51 of the forward intermediate member support link 42. The crank arm 60 retains its position relative to the seat link 35, the pivoting link 66 rotating rearwardly about its pivotal connection 67 to the base member 30. As the seat link 35 swings rearwardly relative to the intermediate member 40 in moving to the intermediate chair position, the four bar linkage supporting the leg rest 23 and the leg rest link 72 swings forwardly and upwardly due to the pivotal motion of the forward seat support link 52 to which one end of the four bar linkage is pivotally connected. The particular arrangement of the four bar linkage swings the leg rest link 72 and the leg rest 23 through 180° from below the bottom of the seat 21 to a position ahead and substantially in line with the seat link 35 when the intermediate position is reached.

Further back pressure by the chair occupant against the back 22 and the back link 37 exerts a rearward force on the seat link 35 and intermediate member 40, which are constrained to move together rearwardly due to the engagement of the rear seat support link 53 with the stop member 68 on the intermediate member, causing the intermediate member 40 to swing rearwardly relative to the base member 30 on the intermediate member forward and rear support links 42 and 43 against the action of the tensioning spring 90. At the same time, the crank arm 60 pivots downwardly from the seat link 35 about the pivot 56*a* and the pivot 65 on the pivot link 66 with the link 63 moves forwardly relative to the seat link 35 and the back link 37 pivots rearwardly relative to the seat link 35. This rearward, swinging motion of the intermediate member 40 carrying the seat link 35, concurrent with the pivoting action of the crank arm 60 and the back link 37, continues until the pin 49 projecting from the intermediate member 40 strikes the upper end 50 of the slot 48 in the forward intermediate member support link 42, which stops the linkage at the fully reclined position. In FIGURES 9–11, the action of the pin 49 in contacting the ends 50 and 51 of the slot 48 are represented by the stops 50 and 51 mounted on the base member. It is obvious that the schematic stops of FIGURES 9–11 are equivalent to the stop arrangement shown in FIGURES 4–8. In the fully reclined position of the fixture, illustrated in FIGURES 7–11, the back link 37 is rotated rearwardly relative to the seat link 35 to define a relatively large obtuse angle between these two links and the seat link and intermediate member are positioned considerably rearwardly and tilted rearwardly from the position they occupy in the normal position of FIGURES 10 and 4.

Figure 7:
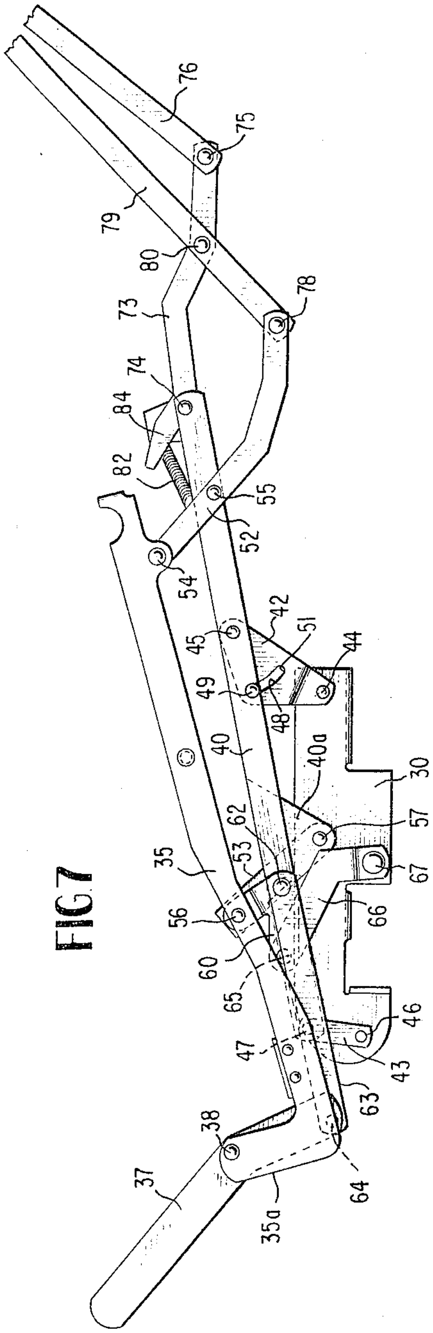
FIGURE 7 is a partial side elevation view of the fixture of FIGURE 6 with the links arranged in the fully reclined chair position.
Figure 8:
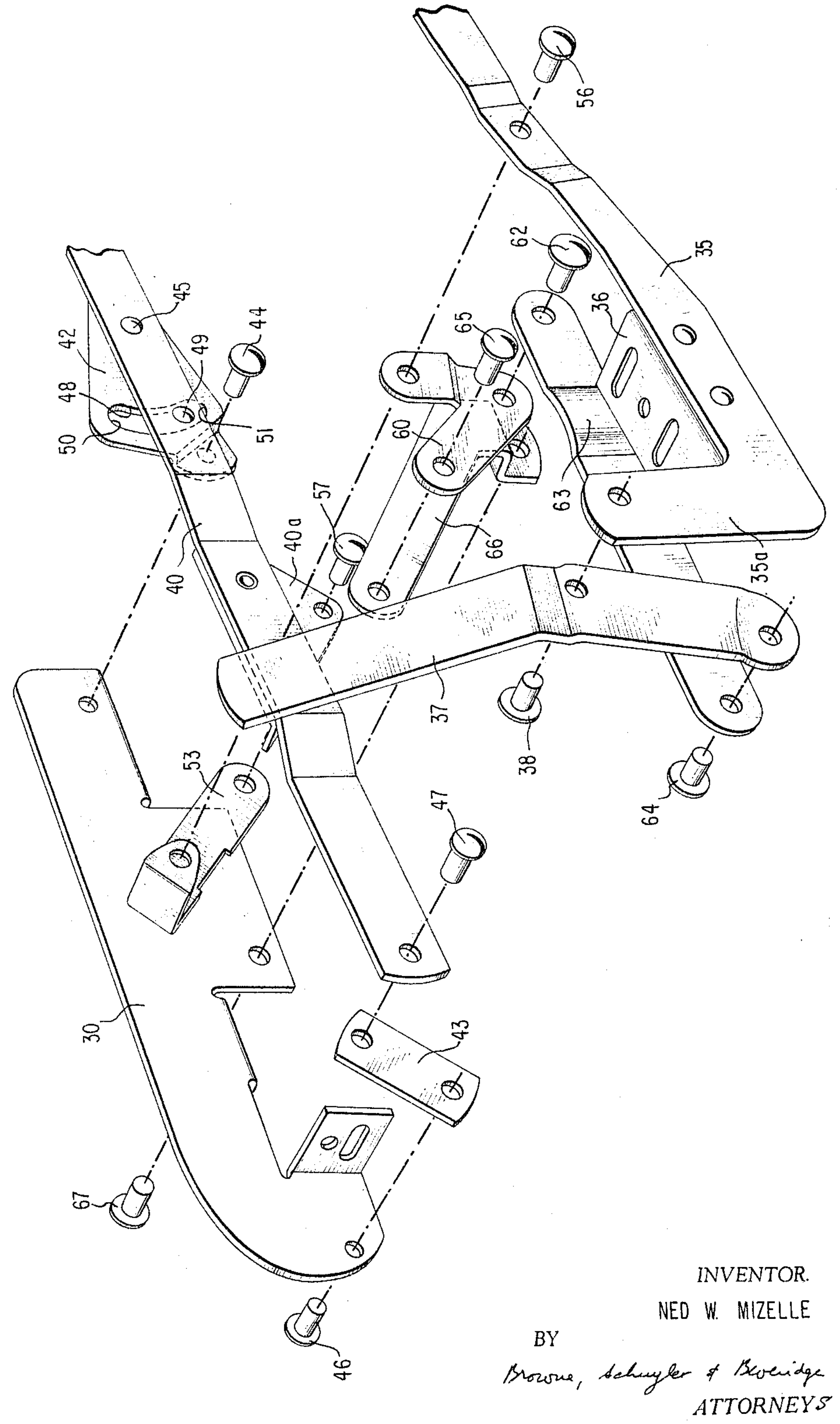
FIGURE 8 is an exploded partial view of the fixture of FIGURE 4.

The operation in moving the chair from the fully reclined position of FIGURES 7 and 11 to the normal position of FIGURES 4 and 9 is the reverse of that previously discussed. Forward pressure on the seat link 35 rotates the back link 37 forwardly while pivoting the bell crank 60 upwardly relative to the seat link and the intermediate member 40 swings forwardly about its forward and rear support links 42 and 43 relative to the base member 30 until the pin 49 contacts the lower end 51 of the slot 48 to stop the forward motion of the intermediate member 40 relative to the base member 30. Continued forward pressure on the seat causes the seat link 35 to swing forwardly relative to the intermediate member 40 about the seat support links 52 and 53, concurrently swing the leg rest supports and the leg rest rearwardly to position the leg rest 23 beneath the seat when the seat link 35 reaches its forwardmost position.

*Embodiment of FIGURES 12–16*

As in the previously described embodiment, the back, seat and leg rest are mounted on the chair base through two fixtures, only one of which is shown for purposes of simplicity. As before, a base member 100 is affixed to transversely extending structural members 101 of the chair base 20 by fasteners affixed to flanges 102 and 103 extending perpendicularly from the bottom portion of the base member 100 to affix it parallel to the sides of the chair. A seat link 104 is affixed to the bottom of the seat by suitable fastenings and fixtures, such as the flange 105 extending perpendicularly from the rear portion of the seat link 104 for fastening to a structural member 106 of the seat 21. A back link, with means for being affixed to the chair back 22, not illustrated, is pivotally mounted on an upwardly extending rear section 104*a* of the seat link 104 by pivot 108. It should be clearly understood that the structural attachments shown between the chair and the fixtures are examples only and other means of structural support of the fixture may be utilized.

An intermediate member 109, having an auxiliary member 110 pivotally connected to it by pivot 111, is pivotally supported from the base member 100 by the intermediate member support linkage means comprising the forward intermediate member support link 112 and the pivotal connection 113 between the rear end of the intermediate member 109 and the base member 100. The forward intermediate member support link 112 has one end pivotally connected to the more forward portion of the base member 100 by pivot 114 and the other end pivotally connected to the forward portion of the auxiliary member by pivot 115, the auxiliary member 110 being pivotally supported intermediate its ends on the intermediate member 109 by pivot 111. Thus the intermediate member 109 through its rear pivot 113 and its attached auxiliary member 110 with forward support link 112 can pivot upwardly and downwardly between the intermediate and fully reclined chair positions illustrated in FIGURES 14 and 15 when actuated by means to be discussed subsequently.

The seat link 104 is pivotally mounted for forward and rearward swinging motion on the intermediate member 109 by the seat support linkage means comprising the forward seat support link 116 and the rear seat support link 117. One end of the forward seat support link 116 connects to the forward end portion of the seat link 104 by pivot 118 and a mid-portion of the link pivotally connects to the intermediate member by pivot 119, whereas the L-shaped rear seat support link 117 is pivotally connected at one end to the rear end portion of the seat link 104 by pivot 120 and the other end pivotally connects to the rear end of the auxiliary member 110 by pivot 121. The rear seat support link 117 has a ledge 122 which is engageable with the underside of a lug 123, which is an extension of the mounting flange 103 of the seat link 104, when the seat link is swung rearwardly relative to the intermediate member 109 to reach the intermediate chair position. Thus, the seat link 104 is supported for rotational and translational motion relative to the intermediate member 109 and the base member 100 in moving from the normal chair position of FIGURE 12 to the intermediate position of FIGURE 14, during which time the intermediate member 109 and its auxiliary member 110 does not move relative to the base member 100.

A leg rest supporting linkage means comprising a leg rest link 125 and a four bar linkage arrangement supports the leg rest 23 from the front seat support link 116 and the intermediate member 109 similar to the arrangement described for the previous embodiment. The leg rest link 125 is pivotally mounted near one end of the outer link 126 at pivot 127, one link 128 of the four bar linkage is pivotally connected at 129 to the intermediate member 109 with the other end being pivotally connected to a second link 130 by pivot 131. The other end of the second link 130 is pivotally connected to an intermediate point on the outer link 126 by pivot 124 while a third link 132 has one end pivotally connected to the outer end of the front seat support link 116 by pivot 133 with the other end being pivotally connected to one end of the outer link 126 by pivot 134, this third link 132 having a pivotal connection 135 to the first link 128 so as to provide the usual four bar, pantograph type linkage system.

An extensible linkage means for moving the intermediate member 109 and seat link 104 between the intermediate and fully reclined positions, while pivoting the back link 107 about the seat link 104, includes an extension link 136 which is pivotally connected at one end to the seat link 104 by pivot 137. The other end of the extension link contains a slot 138 in which rides a round actuating cam 139 which is rotatably mounted on the lower portion of the back link 107 by the pin 140. The mid-portion of the extension link 136 has a pivotal connection 141 to one end of a connecting link 142, shaped similarly to the rear seat support link, and the other end has a pivotal connection 143 to the rear end portion of the base member 100. The mid-portion of the connecting link 142 has a slot 144 with upper and lower ends 144*a* and 144*b*, respectively, a pin 145 extending outwardly from and affixed to an intermediate point on the rear seat support link 117 riding in the slot 144 between the upper and lower ends thereof.

Figure 12:
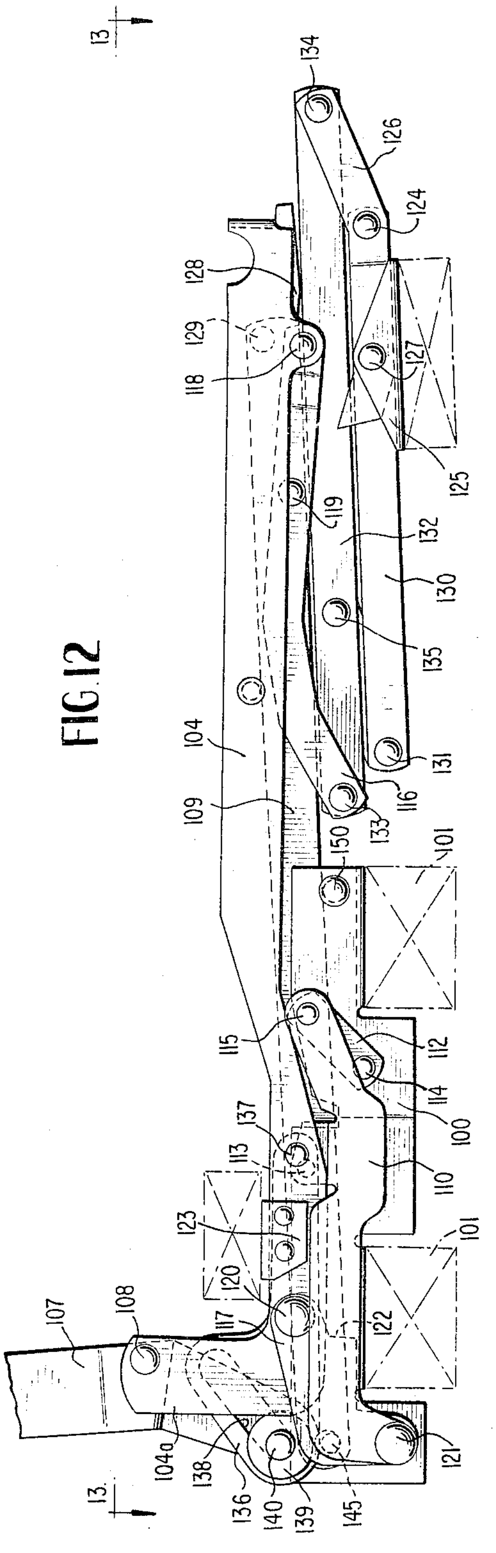
FIGURE 12 is a side elevation of a second embodiment of a fixture with the links arranged to place the chair in the normal upright position.
Figure 13:
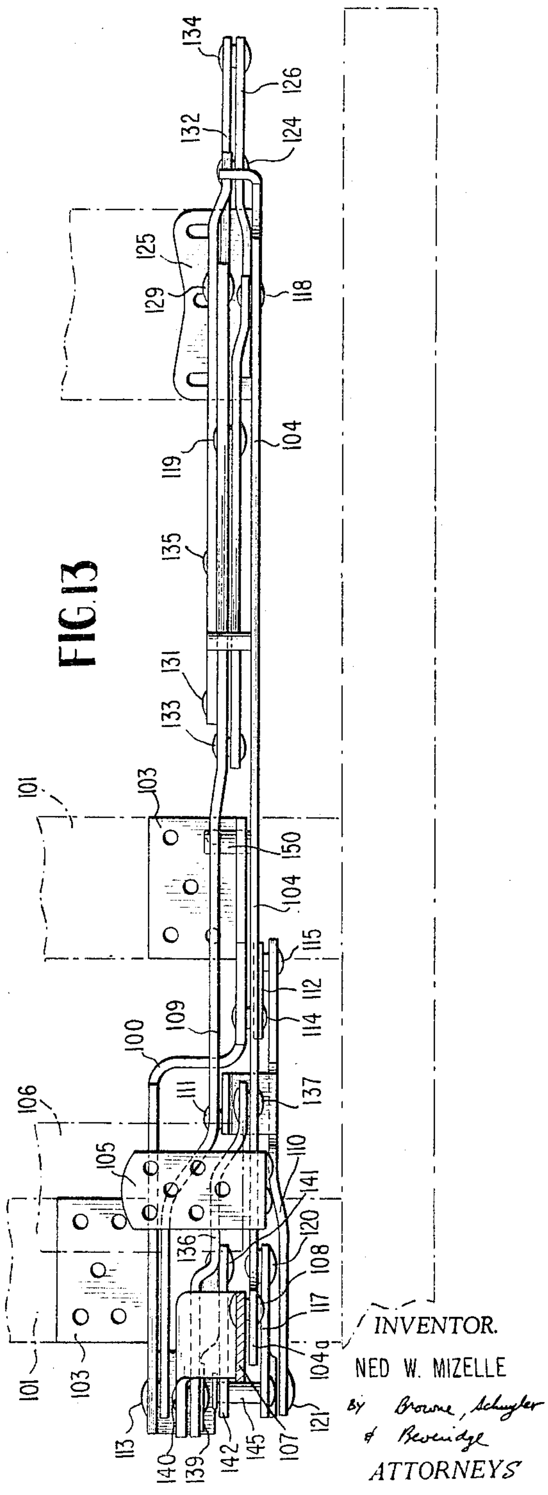
FIGURE 13 is a plan elevation view of the fixture of FIGURE 12 taken along the section line 13—13 of FIGURE 12.
Figure 14:
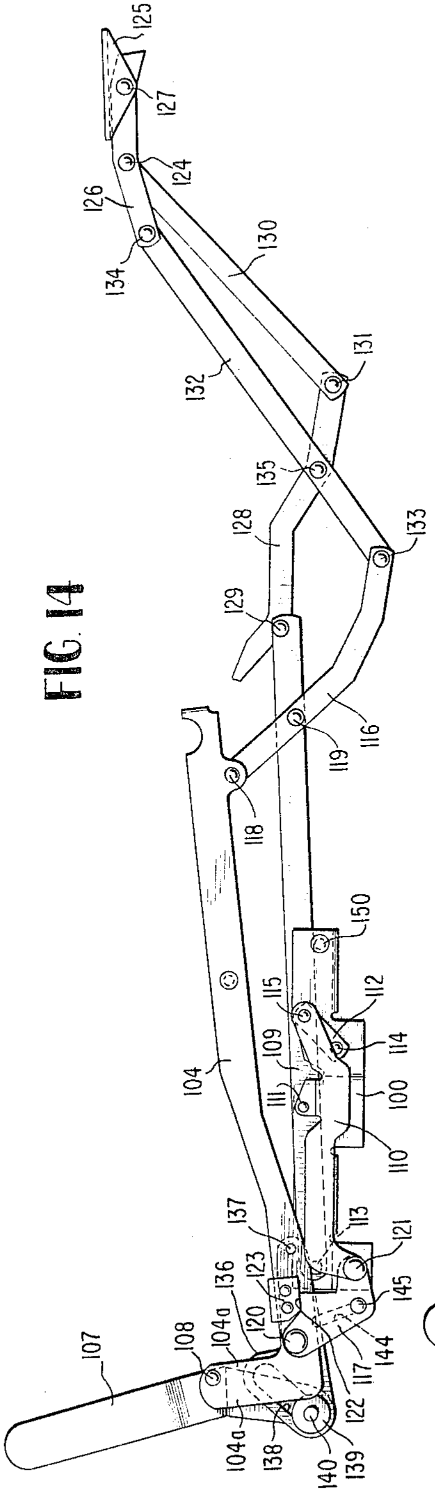
FIGURE 14 is a side elevation view of the fixture of FIGURE 13 with the links arranged in the intermediate chair position.

Reference is made to FIGURES 12–15 in discussing the operation of the above described embodiment whose operation is quite similar to that of the embodiment of FIGURES 4–7, although the structure at the rear portion of the fixtures differs considerably. FIGURE 12 shows the fixture in which the links are positioned with the chair in the normal upright position. The seat link 104 and intermediate member 109 are in their forwardmost position relative to the base member 100 and are generally parallel with the leg rest supporting links retracted beneath the seat link 104 and the intermediate member 109 in generally the same manner as in the previously described embodiment with the top portion of the leg rest link 125 facing downwardly. The back link 107 is in its most erect position relative to the seat link 104 and the cam 139 is positioned at the lower end of the slot 138 in the extension link 136. It should be noted that the generally horizontal alignment of the slot 144 with the connecting link 142 in this position locks the back link 107 from pivoting motion about the seat link 104 since the pin 145 is prevented from moving generally vertically by the horizontal alignment of the slot 144. As the occupant of the chair exerts rearward portion on the seat and seat link 104, the seat link 104 swingably pivots upwardly and rearwardly relative to the intermediate member 109 on the forward and rear seat support links 116 and 117 until the edge of the lug 123 contacts the ledge 122 on the rear seat support link 117 to stop the seat link in the intermediate chair position, as illustrated in FIGURE 14. The relative motion between the forward seat support link 116 and the intermediate member 109 through the four bar linkage system of the leg rest supporting linkage means swings the leg rest and leg rest supporting link 125 through approximately 180° from the retracted position of FIGURE 12 to the extended position of FIGURE 14 in which the leg rest link 125 is ahead of any generally in line with the end of the seat link 104.

The connecting link 142 swings parallel with the rear seat support link 117 in moving between the normal and intermediate chair positions so that the slot 144 is generally vertical when the intermediate chair position of FIGURE 14 is reached. At this time further rear pressure on the seat link 104 and the back link 107 exerted through the flange 123 on the ledge 123 of the rear seat support link 117 forces the intermediate member 109, along with its auxiliary member 110, to pivot upwardly and rearwardly relative to the base member 100 about the intermediate member supporting linkage means, the forward support link 112 and the rear support pivot 113, thus raising the seat link 104 and its rear seat support link 117 relative to the base member. Concurrently, the pin 145 of the rear seat support link 117 rides upwardly in the slot 144 of the pivoting link 142 until the pin engages the upper end 144*a* of the slot and the extension link 136 rotates relative to the base member 100 about pivot 145 on the pivoting link 142 while the cam 139 rides upwardly in the slot 138 in the extension link 136 pivoting the back link 107 relative to the seat link 104 on the pivot 108. Thus the back link 107 through the extensible link means pivots the back link 107 rearwardly relative to the seat link 104 while the seat link and the intermediate member 109 move between the intermediate and the fully reclined chair positions. As noted, the pin 145 affixed to the rear seat support link 117 rides upwardly with the seat link 104 and the intermediate member 109 until it contacts the upper end 144*a* of the slot 144 to prevent any further motion, the cam 139 also contacting the upper end of the slot 138 in a similar manner so that the fixture stops in the full reclined position with the back link 107 tilted rearwardly relative to the seat link 104 at an angle substantially greater than the normal seating angle.

Figure 15:
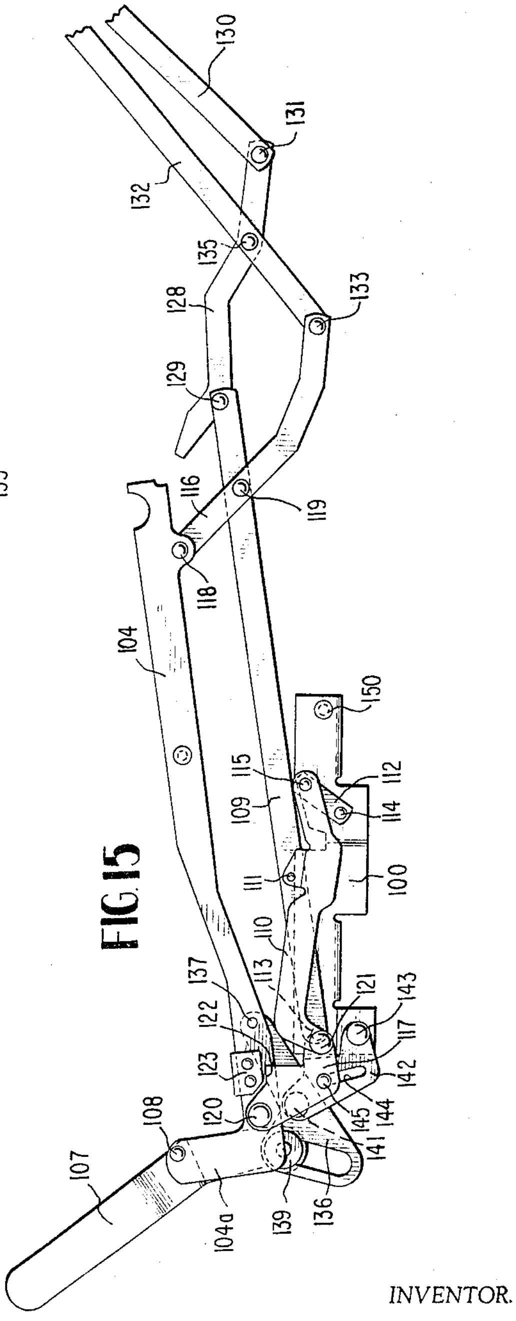
FIGURE 15 is a partial side elevation view similar to FIGURE 14 with the links arranged in the fully reclined chair position.
Figure 16:
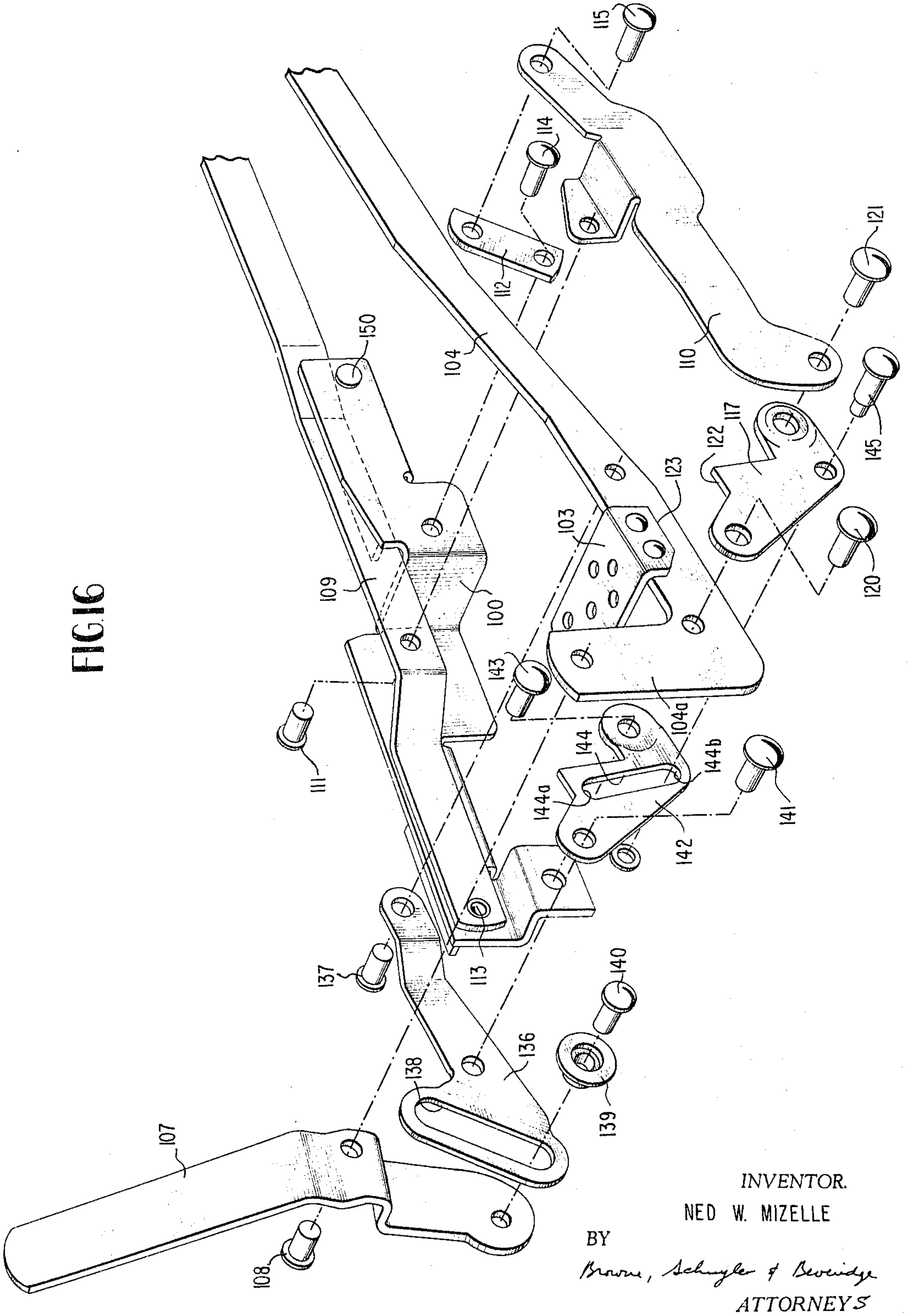
FIGURE 16 is an exploded partial view of the fixture of FIGURE 12.

The operation to move the fixture from the fully reclined chair position of FIGURE 15 to the normal chair position of FIGURE 12 is the reverse of that previously described. As the chair occupant exerts forward pressure, the seat link 104 and intermediate member 109, along with its auxiliary member 110, pivot forwardly and downwardly relative to the base member 100 about the intermediate member support linkage means while the back link 107 through the extensible link means pivots forwardly on the seat link until the lower end of the intermediate member 109 contacts the stop lug 150 in the intermediate chair position of FIGURE 14. Further forward pressure on the seat link 104 then swings the seat link 104 forwardly about its front and rear seat support links relative to the intermediate member 109 and the base member 100, which members do not move relative to each other, and the leg rest supporting linkage means concurrently rotates the leg rest link 125 with the leg rest 23 from the forward leg supporting position to the retracted position beneath the seat link 104 shown in FIGURE 12.

While the above describes and illustrates preferred embodiments of the invention, it should be understood that the invention is not restricted solely to the described embodiments but that it covers all modifications which should be apparent to one skilled in the art and which would fall within the scope and spirit of the invention.

What is claimed is:

1. A fixture for movably supporting the seat, back and leg rest on the base of a reclining chair for relative movement thereon between a normal position in which the seat and back are angularly disposed to define an upright seating angle with the seat generally horizontal and the leg rest retracted under the seat, a fully reclined position in which the back and seat define a substantially greater angle than said upright seating angle and the seat is tilted from the horizontal and moved rearwardly with the leg rest extended ahead of and generally in line with the seat in a leg supporting position, and in intermediate position in which the seat and back are angularly disposed to define said normal seating angle and the seat is tilted and positioned rearwardly on the base to a lesser degree than in said fully reclined position with the leg rest extended in said leg supporting position, said fixture comprising:

a base member adapted to be affixed to the base,
a seat link adapted to be affixed to the seat,
an intermediate member,
seat support linkage means for pivotally interconnecting between pivotal connections on the forward portions and on the rear portions, respectively, of said seat link and said intermediate member for rotational and translational motion of said seat link relative to both said intermediate and base members in moving said seat link between said normal and intermediate chair positions,
first stop means for preventing motion of said seat link relative to said intermediate member rearwardly of said intermediate chair position,
leg rests supporting linkage means adapted to be affixed to the leg rest and pivotally connecting the leg rest to said seat support linkage means and said intermediate member for movement of the leg rest between said retracted and forward leg supporting positions upon movement of said seat link between said normal and intermediate chair positions,
a back link adapted to be affixed to the back and pivotally mounted on the rear of said seat link,
intermediate member support linkage means for pivotally interconnecting between the forward portions and the rear portions, respectively, of said intermediate member and said base member for swinging motion of said link and said intermediaate member relative to said base member in moving between said intermediate and fully reclined chair positions,
second stop means for preventing motion of said intermediate member relative to said base member forward of said intermediate chair position, and
extensible linkage means pivotally interconnecting said back link, said seat link and said base member to pivot said back link about said seat link concurrently with motion of said seat link and intermediate member relative to said base member on said intermediate support linkage means in moving between said intermediate and fully reclined chair positions.

2. The fixture as described in claim 1 wherein said extensible linkage means comprises:

a crank arm having one point pivotally mounted on said seat link and
means for pivotally interconnecting a second pivotal point on said crank arm and a pivotal connection on said back link and a third pivotal point on said crank arm and a pivotal connection on said base member.

3. The fixture as described in claim 1, wherein said seat support linkage means and said intermediate member support linkage means comprises:

a forward seat support link having pivotal connections to the forward portion of said seat link and to the forward portion of said intermediate member,
a rear seat support link having pivotal connections to said seat link and to said intermediate member rearwardly of the pivotal connections of said forward seat support link,
a forward intermediate member support link having pivotal connections to the forward portion of said intermediate member and to the forward portion of said base member, and
a rear intermediate member support link having pivotal connections to said intermediate member and to said base member rearwardly of the pivotal connections of said forward intermediate member support link.

4. The fixture described in claim 3 wherein said extensible linkage means comprises:

a crank arm having a first point pivotally mounted on said seat link,
a link having pivotal connections to a second point on said crank arm and to said base member, and
means for pivotally interconnecting between a pivotal connection on said back link below the pivotal connection to said seat link and a third pivotal connection on said crank arm.

5. The fixture described in claim 4 wherein said leg rest support linkage means includes a four bar linkage in which separate links each have a pivotal connection to said forward seat support link below the pivotal connecnection to said intermediate member and to said intermediate member, respectively.

6. The fixture described in claim 4 wherein said first stop means is a projection affixed to said intermediate member for contact with said rear seat support link at said intermediate chair position and said second stop means is a projection affixed to one of said members for contact with one of said intermediate member support links at said intermediate chair position.

7. A fixture for movably supporting the seat, back and leg rest on the base of a reclining chair for relative movement thereon between a normal position in which the seat and back are angularly disposed to define an upright seating angle with the seat generally horizontal and the leg rest retracted under the seat, a fully reclined position in which the back and seat define a substantially greater angle than said upright seating angle and the seat is tilted from the horizontal and moved rearwardly with the leg rest extended ahead of and generally in line with the seat in a leg supporting position, and an intermediate position in which the seat and back are angularly disposed to define said normal seating angle and the seat is tilted and positioned rearwardly on the base to a lesser degree than in said fully reclined position with the leg rest extended in said leg supporting position, said fixture comprising:

a base member adapted to be affixed to the base,
a seat link adapted to be affixed to the seat,
an intermediate member,
a forward seat support link having spaced pivotal connections to the forward portion of said seat link and the forward portion of said intermediate member,
a rear seat support link having spaced pivotal connections to said seat link and to said intermediate member rearwardly of the pivotal connections of said forward seat support link,
said seat support links supporting said seat link for rotational and translational motion relative to both said intermediate and base members in moving between said normal and intermediate chair positions,
a projection affixed to said intermediate member for contact with said rear seat support link at said intermediate position to prevent motion of said seat link relative to said intermediate member rearwardly of said intermediate chair position, leg rest supporting linkage means adapted to be affixed to the leg rest and having pivotal connections to said forward seat support link below the pivotal connection to said intermediate member and to said intermediate member for movement of the leg rest between said retracted and forward leg supporting positions upon movement of said seat link between said normal and intermediate chair positions, a back link adapted to be affixed to the back and pivotally mounted on the rear of said seat link, a forward intermediate member support link having spaced pivotal connections to the forward portion of said intermediate member and to the forward portion of said base member, a rear intermediate member support link having spaced pivotal connections to said intermediate member and to said base member rearwardly of the pivotal connections of said forward intermediate member support link, said intermediate member support links supporting said intermediate member for swinging motion relative to said base member in moving between said intermediate and fully reclined chair positions, a projection affixed to one of said members for contact with one of said intermediate member support links at said intermediate position for preventing motion of said intermediate member relative to said base member forwardly of said intermediate chair position, a crank arm having a first point pivotally mounted on said seat link, a link having pivotal connections to a second point on said crank arm and to said base member, and means for pivotally interconnecting between a pivotal connection on said back link below the pivotal connection to said seat link and a third pivotal connection on said crank arm, said crank arm, link and last mentioned means pivoting said back link about said seat link concurrently with motion of said seat link and said intermediate member relative to said base member in moving between said intermediate and fully reclined chair positions.

8. The fixture described in claim 1 wherein said extensible linkage means comprises:

an extension link, means for pivotally mounting a first point of said extension link on said seat link, means for pivotally interconnecting between a second pivotal connection on said extension link and a pivotal connection on said base member, and means for slidably connecting said back link to said extension link.

9. The fixture described in claim 8 wherein said seat support linkage means comprises:

a forward seat support link, means for pivotally connecting different points on said seat support link to a forward portion of said seat link and to a forward portion of said intermediate member, respectively, a rear seat support link, means for pivotally connecting one end portion of said rear seat support link to said seat link rearwardly of said forward seat support link pivotal connection.

10. The fixture described in claim 9 wherein said intermediate member support linkage means comprises:

an auxiliary member pivotally mounted intermediate its ends on said intermediate member, means for pivotally interconnecting the forward portion of said auxiliary member and said base member, means for pivotally connecting the rear portion of said auxiliary member to the other end portion of said rear seat support link, and means for pivotally connecting the rear portion of said intermediate member to said base member.

11. A fixture for movably supporting the seat, back and leg rest on the base of a reclining chair for relative movement thereon between a normal position in which the seat and back are angularly disposed to define an upright seating angle with the seat generally horizontal and the leg rest retracted under the seat, a fully reclined position in which the back and seat define a substantially greater angle than said upright seating angle and the seat is tilted from the horizontal and moved rearwardly with the leg rest extended ahead of and generally in line with the seat in a leg supporting position, and an intermediate position in which the seat and back are angularly disposed to define said normal seating angle and the seat is tilted and positioned rearwardly on the base to a lesser degree than in said fully reclined position with the leg rest extended in said leg supporting position, said fixture comprising:

a base member adapted to be affixed to the base, a seat link adapted to be affixed to the seat, an intermediate member, a forward seat support link, means for pivotally connecting different points on said forward seat support link to a forward portion of said seat link and to a forward portion of said intermediate member, respectively, a rear seat support link, means for pivotally connecting one end portion of said rear seat support link to said seat link rearwardly of said forward seat support link pivotal connection, an auxiliary member pivotally mounted intermediate its ends on said intermediate member, means for pivotally connecting the other end portion of said rear seat support link to the rear portion of said auxiliary member, said seat support links supporting said seat link for rotational and translational motion relative to both said intermediate and base members in moving between said normal and intermediate chair positions, first stop means for preventing motion of said seat link relative to said intermediate member rearwardly of said intermediate position, leg rest supporting linkage means adapted to be affixed to the leg rest and having pivotal connections to said forward seat support link below the pivotal connection to said intermediate member and to said intermediate member for movement of the leg rest between said retracted and forward leg supporting positions upon movement of said seat link between said normal and intermediate chair positions, a back link adapted to be affixed to the back and pivotally mounted on the rear of said seat link, means for pivotally interconnecting the forward portion of said auxiliary member and said base member, means for pivotally connecting the rear portion of said intermediate member to said base member, said auxiliary and intermediate member pivotal connection means supporting said intermediate and auxiliary members for pivotal and swinging motion relative to said base member in moving between said intermediate and fully reclined chair positions, second stop means for preventing motion of said intermediate member relative to said base member forward of said intermediate position, an extension link pivotally connected at a first point to said seat link, a connecting link having a pivotal connection near one end to a second point on said extension link and a pivotal connection near the other end to said base member, and means for slidably connecting said back link to said extension link to rotate said extension link about the pivotal connection to said connecting link when said back link pivots on said seat link, said extension link, connecting link and last mentioned means pivoting said back link about said seat link concurrently with motion of said seat link and auxiliary and intermediate members relative to said base member in moving between said intermediate and fully reclined chair positions.

12. A fixture for movably supporting the seat and back on the base of a reclining chair for relative movement thereon between a normal position in which the seat and back are angularly disposed to define an upright seating angle with the seat generally horizontal, a fully reclined position in which the back and seat define a substantially greater angle than said upright seating angle and the seat is tilted from the horizontal and moved rearwardly, and an intermediate position in which the seat and back are angularly disposed to define said normal seating angle and the seat is tilted and positioned rearwardly on the base to a lesser degree than in said fully reclined position, said fixture comprising:

a base member adapted to be affixed to the base, a seat link adapted to be affixed to the seat, an intermediate member, seat support linkage means for pivotally interconnecting between pivotal connections on the forward portions and on the rear portions, respectively, of said seat link and said intermediate member for rotational and translational motion of said seat link relative to both said intermediate and base members in moving said seat link between said normal and intermediate chair positions, first stop means for preventing motion of said seat link relative to said intermediate member rearwardly of said intermediate chair position, a back link adapted to be affixed to the back and pivotally mounted on the rear of said seat link, intermediate member support linkage means for pivotally interconnecting between the forward portions and the rear portions, respectively, of said intermediate member and said base member for swinging motion of said seat link and said intermediate member relative to said base member in moving between said intermediate and fully reclined chair positions, second stop means for preventing motion of said intermediate member relative to said base member forward of said intermediate chair position, and extensible linkage means pivotally interconnecting said back link, said seat link and said base member to pivot said back link about said seat link concurrently with motion of said seat link and intermediate member relative to said base member on said intermediate support linkage means in moving between said intermediate and fully reclined chair positions.

13. A fixture for movably supporting the seat and back on the base of a reclining chair for relative movement thereon between a normal position in which the seat and back are angularly disposed to define an upright seating angle with the seat generally horizontal, a fully reclined position in which the back and seat define a substantially greater angle than said upright seating angle and the seat is tilted from the horizontal and moved rearwardly, and an intermediate position in which the seat and back are angularly disposed to define said normal seating angle and the seat is tilted and positioned rearwardly on the base to a lesser degree than in said fully reclined position, said fixture comprising:

a base member adapted to be affixed to the base and having a first, a second and a third fixed pivot, a seat link adapted to be affixed to the seat and having a forward and a rear seat pivot, an intermediate member having a first, a second, a third and a fourth intermediate pivot, a front seat support link pivotally connected between said forward seat pivot and said first intermediate pivot, a rear seat support link pivotally connecting between said rear seat pivot and said third intermediate pivot, said seat support links movably supporting said seat link for rotational and translational motion relative to both said intermediate and base members in moving between said normal and intermediate chair positions, first stop means for preventing motion of said seat link relative to said intermediate member rearwardly of said intermediate chair position, a back link adapted to be affixed to the back and pivotally mounted on the rear of said seat link, a forward intermediate member support link pivotally connecting between said second intermediate pivot and said first fixed pivot, a rear intermediate member support link pivotally connected between said fourth intermediate pivot and said third fixed pivot, said intermediate member support links supporting said intermediate members for swinging motion relative to said base member in moving forwardly and rearwardly between said intermediate and fully reclined chair positions, second stop means for preventing motion of said intermediate member relative to said base member forwardly of said intermediate chair position, and extensible linkage means pivotally interconnecting to a pivotal connection on said back link and said seat link and to said second fixed pivot to pivot said back link about said seat link concurrently with motion of said seat link and intermediate member relative to said base member on said intermediate member support links in moving between said intermediate and fully reclined chair positions.

14. The fixture described in claim 13 wherein said extensible linkage means comprises:

a crank arm having a first, a second and a third crank pivot, means for pivotally connecting said first crank pivot to said seat link, means for pivotally connecting said second crank pivot and a pivot on said back link below the pivotal connection to said seat link, and means for pivotally interconnecting said third crank pivot and said second fixed pivot.

15. A fixture for movably supporting the seat and back on the base of a reclining chair for relative movement thereon between a normal position in which the seat and back are angularly disposed to define an upright seating angle with the seat generally horizontal, a fully reclined position in which the back and seat define a substantially greater angle than said upright seating angle and the seat is tilted from the horizontal and moved rearwardly, and an intermediate position in which the seat and back are angularly disposed to define said normal seating angle and the seat is tilted and positioned rearwardly on the base to a lesser degree than in said fully reclined position, said fixture comprising:

a base member adapted to be affixed to the base and having a first, a second and a third fixed pivot, a seat link adapted to be affixed to the seat and having a forward and a rear seat pivot, an intermediate member having a first and second intermediate pivot and pivotally connecting rearwardly of said intermediate pivots to said second fixed pivot, an auxiliary member having a forward and a rear auxiliary pivot and intermediately thereof pivotally connecting to said second intermediate pivot, a front seat support link pivotally connected between said forward seat pivot and said first intermediate pivot, a rear seat support link pivotally connected between said rear seat pivot and said rear auxiliary pivot, said seat support links supporting said seat link for rotational and translational motion relative to said intermediate, auxiliary and base members in moving between said normal and intermediate chair positions, first stop means for preventing motion of said seat link relative to said intermediate member rearwardly of said intermediate chair position, a back link adapted to be affixed to the back and pivotally mounted on the rear of said seat link, a forward intermediate member support link pivotally connected between said first fixed pivot and said forward auxiliary pivot, said intermediate and auxiliary members being pivotally supported by said forward intermediate member support link and said pivotal connection to said second fixed pivot for pivotal and translational motion relative to said base member in moving between said intermediate and fully reclined chair positions, second stop means for preventing motion of said intermediate member relative to said base member forwardly of said intermediate chair position, an extension link pivotally connected at a first point on said seat link intermediate said forward and rear seat pivots, a connecting link pivotally connecting between a second pivotal point on said extension link and said third fixed pivot, and means for slidably connecting said back link to said extension link to rotate said extension link about its second pivotal point upon rotation of said back link about said seat link concurrently with movement of said seat link and said auxiliary and intermediate members relative to said base member in moving between said intermediate and fully reclined chair positions.

References Cited by the Examiner

UNITED STATES PATENTS

| | | | |
|---|---|---|---|
| 3,069,201 | 12/1962 | Belisle et al. | 297—85 |
| 3,086,814 | 4/1963 | Fletcher | 297—84 |
| 3,128,122 | 4/1964 | Mizelle | 297—88 X |
| 3,135,547 | 6/1964 | Schliephacke | 297—83 |
| 3,135,548 | 6/1964 | Fletcher et al. | 297—89 |
| 3,157,431 | 11/1964 | Fletcher | 297—84 |
| 3,163,464 | 12/1964 | Martin et al. | 297—85 |
| 3,166,353 | 1/1965 | Re | 297—83 X |
| 3,169,794 | 2/1965 | Fletcher | 297—322 X |
| 3,172,697 | 3/1965 | Fletcher | 297—322 X |
| 3,210,119 | 10/1965 | Schliephacke | 297—322 |

FRANK B. SHERRY, *Primary Examiner.*

J. T. McCALL, *Assistant Examiner.*